US006133568A

United States Patent [19]

Weiss et al.

[11] Patent Number: 6,133,568

[45] Date of Patent: Oct. 17, 2000

[54] ION TRAP MASS SPECTROMETER OF HIGH MASS-CONSTANCY

[75] Inventors: Gerhard Weiss; Alfred Kraffert, both of Weyhe; Michael Schubert; Jochen Franzen, both of Bremen, all of Germany

[73] Assignee: Bruker Daltonik GmbH, Bremen, Germany

[21] Appl. No.: 09/123,337

[22] Filed: Jul. 28, 1998

[30] Foreign Application Priority Data

Aug. 5, 1997 [DE] Germany ........................... 197 33 834

[51] Int. Cl.[7] ............................ H01J 49/00; B01D 59/44

[52] U.S. Cl. ............................................ 250/292; 250/281

[58] Field of Search .................................... 250/292, 291, 250/290, 288, 281

[56] References Cited

U.S. PATENT DOCUMENTS

| | | | |
|---|---|---|---|
| 4,032,782 | 6/1977 | Smith et al. | 250/292 |
| 5,028,777 | 7/1991 | Franzen et al. | 250/282 |
| 5,399,857 | 3/1995 | Doroshenko et al. | 250/292 |
| 5,629,519 | 5/1997 | Palermo | 250/292 |
| 5,644,131 | 7/1997 | Hansen | 250/292 |
| 5,796,100 | 8/1998 | Palermo | 250/292 |

FOREIGN PATENT DOCUMENTS

WO 9744813 11/1997 WIPO .

OTHER PUBLICATIONS

R.E. Mather et al., *Some Operational Characteristics of a Quadrupole Ion Storage Mass Spectrometer Having Cylindrical Geometry,* International Journal of Mass Spectrometry and Ion Physics, 33 (1980) 201–230.

Raymond E. March et al., *Fundamentals of Ion Trap Mass Spectrometry,* vol. 1; *Ion Trap Instrumentation,* vol. 1l; *Chemical, Environmental, and Biomedical Applications,* vol. 1ll, Practical Aspects of Ion Trap Mass Spectrometry.

*Primary Examiner*—Seungsook Ham
*Assistant Examiner*—John Patti

[57] ABSTRACT

The invention relates to high performance ion traps used as mass spectrometers which in spite of a variable thermal load require a high constancy of the mass scale calibrated in. Ion traps consist at least of one ring electrode, two end cap electrodes, and suitable fixing elements which determine the distance between the electrodes. When exposed to a thermal load, the parts of the ion trap are subject to thermal expansion, which leads to a change in field intensities even if the applied RF voltage is constant, and thus to an apparent shift of masses. The invention consists of selecting the thermal expansion of the ion trap parts in such a way that when a constant RF voltage is applied, the field intensity within the trap remains constant by first approximation, in spite of the altering geometric form and expansion with changing operating temperature. In this way, displacement of the mass scale is avoided. To compensate an unavoidable thermal expansion $\Delta r_0$ of the ring electrode with an inscribed radius $r_0$ by a ratio $\Delta r_0/r_0$, the distance $z_0$ of the end cap poles from the center of the trap must become smaller by the proportional ratio $\Delta z_0/z_0=-\Delta r_0/r_0$. This compensation can be achieved by a suitable design with suitably selected expansion coefficients for the ion trap electrode material and the material of the fixing elements.

11 Claims, 1 Drawing Sheet

ION TRAP MASS SPECTROMETER OF HIGH MASS-CONSTANCY

FIELD OF INVENTION

The invention relates to high performance ion traps used as mass spectrometers which require a high constancy of the calibrated mass scale in spite of a variable thermal load. Ion traps consist at least of one ring electrode, two end cap electrodes, and suitable fixing elements which determine the distance between the electrodes. When exposed to changing temperatures, the parts of the ion trap are subject to thermal expansion, which leads to a change in field intensities even if the applied RF voltage is constant, and thus to an apparent shift of masses.

PRIOR ART

The function and operation of ion trap spectrometers is described in the standard book "Practical Aspects of Ion Trap Mass Spectrometry", volumes I to III, ed. by Raymond E. March and John F. J. Todd, CRC Series Modem Mass Spectrometry, CRC Press, Boca Raton, New York, London, Tokyo 1995.

RF frequency ion traps, as invented by Wolfgang Paul, are used increasingly as high performance mass spectrometers. Thus ion trap mass spectrometers with mass ranges of up to 6,000 atomic mass units and with mass resolutions of greater than R=15,000 are available commercially. These ion traps require an especially stable mass scale which does not become displaced in spite of altered operating or environmental conditions.

The term "mass scale" should be defined here as the assignment of ion masses (or more precisely, the mass-to-charge ratio) to measurement signals, performed by a connected computer system. This mass scale is calibrated using a special measuring method by means of precisely known reference substances and should remain stable for as long as possible without recalibration. For the most commonly used operating modes for ion traps, the mass scale of an ion trap is essentially a relationship between the mass of the ions and the computer-controlled RF voltage, at which the ions are ejected from the trap during a scan and measured.

However, the ions are not actually ejected from the trap by the RF voltage, but rather by the field intensity of the RF field prevailing within the ion trap. Therefore if the size of the ion trap is changed by thermal expansion, the electrical field also changes even if the applied RF voltage remains constant, thus changing the mass scale.

This effect may be overcome in various ways. There are ion trap mass spectrometers in which the ion trap is subjected to controlled heating. Since modern high performance ion traps operate at RF voltages of 25 kilovolts (peak to peak) however, this heating is very costly due to the insulation required and unfortunately also very slow, so that long burn-in times of 30 minutes to two hours are necessary to achieve an equilibrium. Variable loads due to dielectric losses in RF voltages during operating changes cannot be sufficiently offset.

Heating of the ion traps was necessary as long as analysis substances were introduced directly into the ion trap and ionized there. Heating prevented condensation of analysis substances on the surfaces and thus avoided surface charge phenomena. Modern developments in ionization methods such as electrospray however make it possible to generate ions outside the vacuum system and bring them from the outside into the ion trap without accompanying analyte substances. Here, operation of ion traps is no longer jeopardized by the threat of contamination to the surfaces by analyte substances. This is why unheated ion traps are increasingly being used. On the other hand, it also appears possible to measure the temperature of the ion trap directly and control the RF voltage or the software operation accordingly. Due to the difficulty of undisturbedly measuring the temperature under these conditions, these procedures have not been realized up to now.

The influence of ion trap temperature on the mass scale must not be ignored: due to dielectric losses in the insulating materials of the ion trap, but also due to other influences of an instrument as it heats, temperature rises up to 40° C. above ambient temperature are generated for unheated ion traps depending on the operating conditions. The stainless steels most often used for ion traps have an expansion coefficient of about $\alpha=13\times10^{-6}\ K^{-1}$. This results in a relative expansion of the ion trap of about $5\times10^{-4}$, and thus again (due to the quadratic dependence of the mass on the linear trap dimensions) a displacement in the mass scale of $1\times10^{-3}$. For a mass of 2,000 u, by a temperature rise of about 40° C. a displacement of 2 atomic mass units occurs, for a mass of 6,000 u, a displacement of 6 mass units. These displacements are intolerable, since the user of such a mass spectrometer expects the mass scale to remain constant with a maximum long-term deviation of a tenth of an atomic mass unit. In particular, the equipment should be ready to operate immediately after switching on.

OBJECTIVE OF THE INVENTION

It is the objective of the invention to design an ion trap mass spectrometer in such a way that if RF voltage applied is constant the electric field distribution within the ion trap remains constant in the first approximation with expansions of the ion trap parts due to temperature changes, so that in spite of temperature changes there is no change in the relationship between the applied RF voltage and the detected ion mass.

DESCRIPTION OF THE INVENTION

It is the basic idea of the invention to compensate for an unavoidable expansion of the ring electrode and thus an enlargement of the ring radius $r_0$ in such way that the distance $z_0$ of the end cap poles from the center of the trap is reduced proportionate to the enlargement of the ring radius $r_0$. In this way the field intensities within the ion trap are kept constant in a first order approximation at every location. The minor changes in the form of the electrodes can be disregarded here, since they only result in a very small second order influence on the relative expansion. Since, as described above, this relative expansion is within the order of magnitude of $10^{-3}$, the second order influence can be disregarded.

In an ion trap, the fields remain constant if the following relation holds true:

$$\Delta z_0/z_0=-\Delta r_0/r_0. \quad (1)$$

It is a further basic idea of the invention to generate this compensation of relative geometrical distances by the selection of expansion coefficients for the materials of the ion trap electrodes and the fixation elements, and by a corresponding geometric design.

Let us, for example, assume that the spacers (4, 5) of the ion trap in FIG. 1 have no thermal expansion whatsoever, which can for example be achieved using well-known glass ceramic materials (such as ZERODUR® or CERAN®). Let $z_1$ be the distance of the end cap poles from the supporting surfaces of the spacers, and $z_0$ the distance of the end cap poles from the center of the trap. If then the simple relationship is $z_1=z_0$ applies, this compensation is automatically produced independent of the expansion coefficient of the trap materials if the end caps and ring electrodes are made of the same material. Due to the strict temperature constancy of the distance $z_1+z_0$, $z_0$ decreases to the relative extent that radius $r_0$ increases.

For spacers with non-zero, low expansion coefficients, somewhat slightly more complicated conditions can be derived which are necessary for compensation.

BEST EMBODIMENTS

As already mentioned above, an ideal embodiment consists of using spacers without any thermal expansion. Materials without any thermal expansion are known. Primary among these are glass ceramic materials such as ZERODUR® CERAN®, which demonstrate practically no thermal expansion in a range between ambient temperature and several hundred degrees Celsius. But quartz glass as well has a very low relative coefficient of linear expansion of only $\alpha=0.5\times10^{-6}\ K^{-1}$. Among metals, INVAR® has a very low expansion coefficient of $\alpha=1.5\times10^{-6}\ K^{-1}$, while stainless steels and the other materials preferred for ion traps for other reasons have a much high expansion coefficient of about $\alpha=13\times10^{-6}\ K^{-1}$.

A spacer without thermal expansion can also be designed using a combination of two materials compensating each other's expansion in back and forth direction as is known from the compensation elements of a clock pendulum.

If the distance $z_1$ of the end cap poles from the contact surface of the spacer is now made exactly as large as the distance $z_0$ of the end cap poles from the center of the trap, and if the trap electrode materials are identical, for any temperature the equation (1) is automatically fulfilled due to the strict temperature constancy of distance $z_0+z_1$: $\Delta z_0/z_0=-\Delta z_1/z_1=-\Delta r_0/r_0$. In this way, the requirement for compensation of the enlargement of $r_0$ by a proportionate reduction of $z_0$ is fulfilled.

Figure 1:
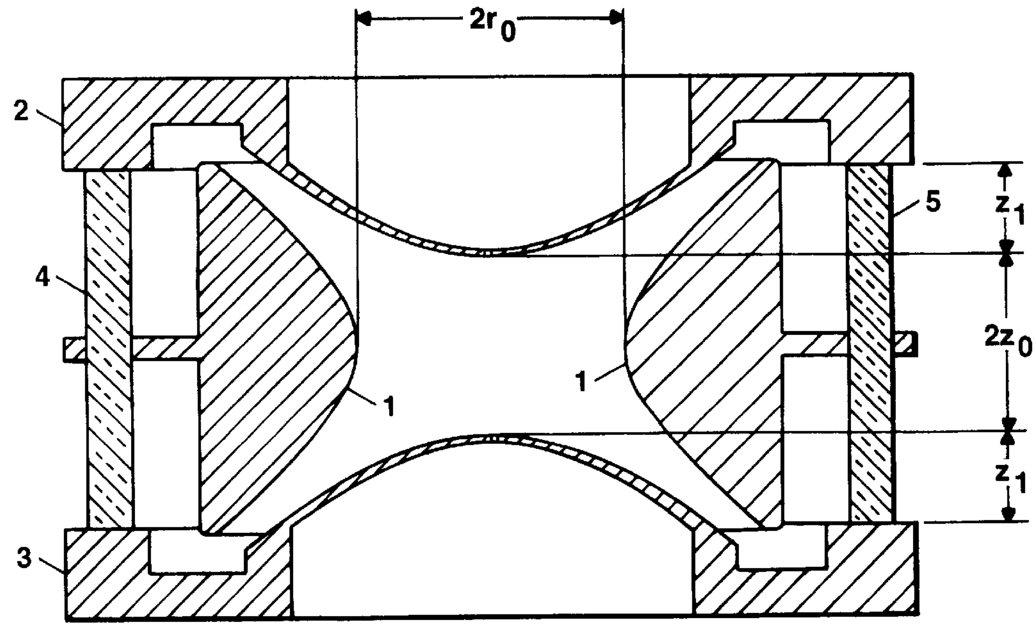
FIG. 1 schematically shows an open ion trap in which the interior is joined openly with the exterior via a gap between the ring electrode (1) and end caps (2, 3). Both end caps (2, 3) are kept in the correct position relative to one another via the column-shaped, electrically insulating spacers (4, 5) and the ring electrode (1) is attached to these insulating spacers. The figure shows the significance of the designations $r_0$, $z_0$ and $z_1$. The fastenings holding the trap parts together have been omitted for the sake of simplicity. They can be produced by using screws or adhesive.
Figure 2:
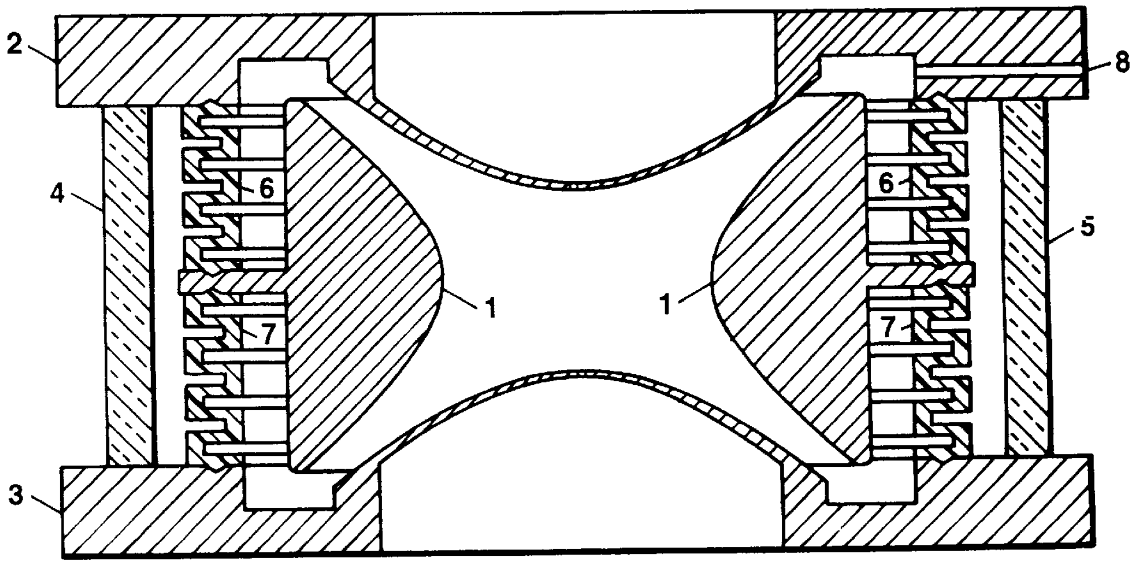
FIG. 2 schematically shows the type of a closed ion trap which can be filled with damping gas via the hole (8) without having to fill the vacuum of the exterior up to the same pressure. The inlet and outlet holes for ions in the end caps are the only connections to the outer chamber. The ring electrode (1) is held precisely between the end caps (2, 3) via two cylindrical, electrically highly insulating, longitudinally elastic wall pieces (6, 7). These wall pieces seal off the ion trap. They are longitudinally elastic to a small degree and can therefore compensate for thermal spacing changes. Due to the special shape, longitudinal elasticity and an especially high electric strength, which can withstand loads of greater than 25 kilovolts, are simultaneously achieved.

This compensation applies both to the open ion trap according to FIG. 1 as well to the closed ion trap in FIG. 2. The ion trap according to FIG. 2 has cylindrical walls (6, 7) which permit filling of the ion trap with a damping gas without having to fill the trap surroundings up to the same pressure. The wall elements (6, 7) must be highly insulating and extremely resistant against surface discharges since they must hold voltages up to 25 kilovolts. They can be produced, for example, of elastic plastic such as filled TEFLON®, polyimide or PEEK®. The choice of plastics should especially be made according to the dielectric losses.

Compensation by means of spacers which have zero thermal linear expansion is especially favorable for the enclosed design according to FIG. 2. In this ion trap, heating occurs in the insulating walls (6, 7) due to dielectric losses during operation, the magnitude of which is dependent upon the mode of operation. The released quantities of heat are distributed via thermal conductivity in a relatively uniform manner to both the end caps as well as to the ring electrode, which therefore heat up. The thermal expansion due to this heating must be compensated for. However, heating of the electrically insulating spacers, which the heat flow only indirectly reaches and which also possess a poor thermal conductivity due to the electric insulation, is very much slower. If the expansion of the spacers is zero, temporal delay of the heating is of no importance. For this reason, it is especially favorable to keep thermal expansion of the spacers as minimal as possible.

Glass ceramic (such as CERAN®) is, however, only moderately suitable for this purpose due to its brittleness. If good mechanical strength and impact resistance are additionally required from the ion trap, it is then better to fall back upon a combination of metal with insulating, highly resistant ceramic sleeves for the spacers. Here the metal alloy INVAR® is especially recommended. However, residual expansion of the INVAR® and that of the insulating ceramic sleeves must also be taken into account. Since the distance $z_0+z_1$ of the end cap electrodes no longer remains constant during thermal expansion, the distance $z_1$ of the end cap poles from the supporting surface of the spacers must be increased somewhat in order to maintain the condition of equation (1): $\Delta z_0/z_0=-\Delta r_0/r_0$.

Here the enlargement of the distance $z_1$ of the end cap poles from the surface of attack of the spacers by the amount $z_1-z_0$ must exactly compensate for expansion of the retaining elements with the length $z_1+z_0$:

$$\alpha_h\times(z_1+z_0)=\alpha_r\times(z_1-z_0), \tag{2}$$

whereby $\Delta_h$, is the expansion coefficient of the spacers and $\Delta_r$, the expansion coefficient of the electrode material of the ion trap. The result is the length $z_1$ which must be used for the design of the ion trap:

$$z_1=z_0\times(\alpha_r+\alpha_h)/(\alpha_r-\alpha_h). \tag{3}$$

Any specialist in the field will be able to make appropriate calculations according to the indicated principles if the materials for the spacers are not uniform, or if the end cap electrodes and ring electrodes consist of different materials. Since the temperature expansion coefficients for the materials given by the manufacturers often are not precisely correct, it is always favorable to analyze the found optimal design experimentally for stability of the mass scale and, if necessary, make appropriate corrections.

Of course, the spacers could also have forms which deviate from the column forms shown in FIGS. 1 and 2. Here any form can be used without invalidating the principles given here. In particular, the cylindrical closing walls (6, 7) of the ion trap could for example be used as spacers. However, they must then be designed in a longitudinally stable form, differently than in FIG. 2. They could, for example, be produced in the form of cylindrical tube rings made of quartz glass.

Any specialist in the field of ion traps will be able to draft and produce more complicated designs of ion traps using the basic principles indicated here so that the mass scale remains constant even if the ion trap structure is subject to thermal expansion.

What is claimed is:

1. Ion trap for mass spectrometric measurements with high thermal constancy of the calibrated mass scale, comprising a ring electrode, two end cap electrodes, and elements for the mutual fixation of the electrodes, wherein a decrease in field strength inside the ion trap due to a relative thermal expansion of an inner radius $R_0$ of the ring electrode by a ratio $\Delta R_0/R_0$ is at least approximately compensated for by a corresponding increase in field strength due to a reduction in a distance $Z_0$ between a pole of each end cap and a center of the trap by a ratio $\Delta Z_0/Z_0$, wherein $\Delta Z_0/Z_0$ is approximately equal to $-\Delta R_0/R_0$.

2. Ion trap according to claim 1, wherein said compensation is achieved through the use of trap electrode material and material for the fixation elements having predetermined coefficients of thermal expansion.

3. Ion trap according to claim 2, wherein the fixation elements have an effective thermal coefficient of expansion close to zero, either due to the choice of material or by a compensating arrangement of elements with different coefficients of expansion, and wherein a distance $Z_1$ in a direction parallel to an axis of rotational symmetry of the ring electrode between each end cap pole and a surface of that electrode to which the fixation elements are attached is approximately equal to the distance $Z_0$ of the end cap poles from the center of the trap.

4. Ion trap according to claim 3, wherein the fixation elements comprise at least one of a glass ceramic material, a low thermal expansion coefficient metal and a quartz glass.

5. Ion trap according to claim 2, wherein the fixation elements have a relatively low coefficient of thermal expansion and a distance $Z_1$ in a direction parallel to an axis of rotational symmetry of the ring electrode between each end cap pole and a surface of that electrode to which the fixation elements are attached is larger than the distance $Z_0$ of the end cap poles from the center of the trap.

6. An ion trap mass spectrometer comprising:

a ring electrode having an inner radius $R_0$; and a pair of end cap electrodes, each having a minimum distance $Z_0$ from a center of the ion trap, wherein ion trap component materials have relative coefficients of thermal expansion such that, for an expected thermal operating range of the ion trap, a thermally-induced expansion or contraction in said minimum distance $Z_0$ is approximately equal and opposite to a thermally-induced expansion or contraction in said inner radius $R_0$.

7. A mass spectrometer according to claim 6 further comprising spacers that are rigidly connected to each of the end cap electrodes and maintain the separation therebetween.

8. A mass spectrometer according to claim 7 wherein the ring electrode is rigidly connected to the spacers.

9. A mass spectrometer according to claim 8 wherein the end caps and the ring electrode each have a coefficient of thermal expansion $\alpha_t$, and the spacers have coefficient of thermal expansion $\alpha_h$, and wherein $\alpha_t(Z_1+Z_0)=\alpha_h(Z_1-Z_0)$ where, in a first direction parallel to an axis of rotational symmetry of the ring electrode, $Z_1$ is approximately equal to the separation between a pole of each end cap electrode and a point at which that electrode contacts the spacers.

10. An ion trap mass spectrometer comprising:

a ring electrode;

a pair of end cap electrodes, each having a coefficient of thermal expansion equal to that of the ring electrode, and each being located to provide a distance $Z_0$ between its pole and a center of the ion trap; and a plurality of spacers to which the end cap electrodes are rigidly secured, the spacers having a negligible coefficient of thermal expansion and being connected to each of the end cap electrodes at a connection point, wherein a distance $Z_1$ between said connection point and a pole of an cap electrode in a first direction parallel to an axis of rotational symmetry of the ring electrode is approximately equal to $Z_0$.

11. A mass spectrometer according to claim 10 wherein the spacers comprise at least one of a glass ceramic material, a low thermal expansion coefficient metal and a quartz glass.

* * * * *